US009747181B2

(12) United States Patent
Marko et al.

(10) Patent No.: US 9,747,181 B2
(45) Date of Patent: Aug. 29, 2017

(54) SYSTEM AND METHOD FOR INSPECTION OF SYSTEM STATE DURING TESTING

(71) Applicant: Red Hat, Inc., Raleigh, NC (US)

(72) Inventors: Juraj Marko, Kanianka (SK); Dalibor Pospišil, Kobylnice (CZ)

(73) Assignee: RED HAT, INC., Raleigh, NC (US)

(*) Notice: Subject to any disclaimer, the term of this patent is extended or adjusted under 35 U.S.C. 154(b) by 182 days.

(21) Appl. No.: 14/596,910

(22) Filed: Jan. 14, 2015

(65) Prior Publication Data
US 2016/0203067 A1  Jul. 14, 2016

(51) Int. Cl.
G06F 11/00 (2006.01)
G06F 11/22 (2006.01)
G06F 11/30 (2006.01)

(52) U.S. Cl.
CPC ...... G06F 11/2289 (2013.01); G06F 11/2268 (2013.01); G06F 11/3051 (2013.01)

(58) Field of Classification Search
CPC .. G06F 11/26; G06F 11/2268; G06F 11/2247; G06F 11/2252; G06F 11/2273; G06F 11/2289; G06F 11/24; G06F 11/3051; G06F 11/3668; G06F 11/3696
See application file for complete search history.

(56) References Cited

U.S. PATENT DOCUMENTS

| | | | | |
|---|---|---|---|---|
| 6,505,249 B1* | 1/2003 | Rehkopf | ............ | H04L 29/06 702/182 |
| 9,015,832 B1* | 4/2015 | Lachwani | ............ | G06F 21/52 726/22 |
| 9,015,844 B1* | 4/2015 | Franklin | ............ | G06F 21/577 713/165 |
| 2004/0010584 A1* | 1/2004 | Peterson | ............ | H04L 12/2602 709/224 |
| 2007/0028302 A1* | 2/2007 | Brennan | ............ | G06F 21/55 726/24 |
| 2013/0160131 A1* | 6/2013 | Madou | ............ | G06F 11/3688 726/25 |

OTHER PUBLICATIONS

AIDE—Gentoo Wiki, 6 pages, http://wiki.gentoo.org/wiki/AIDE, retrieved on Nov. 24, 2014.

* cited by examiner

*Primary Examiner* — Michael Maskulinski
*Assistant Examiner* — Anthony J Amoroso
(74) *Attorney, Agent, or Firm* — Haynes and Boone, LLP

(57) ABSTRACT

A system and method for inspecting system state during testing includes determining one or more inspection modules for examining respective portions of a state of the system using a test inspector, initializing each of the inspection modules, saving the respective portions of the state of the system using the inspection modules, executing a test of the system, checking the respective portions of the state of the system using the inspection modules, and repeating the saving, executing, and checking for each additional test of the system. The test inspector is executed by one or more processors of the system. In some examples, saving a first one of the respective portions of the state of the system includes determining state variables and corresponding values associated with the first respective portion of the state of the system and saving the state variables and corresponding values in a state repository.

20 Claims, 4 Drawing Sheets

SYSTEM AND METHOD FOR INSPECTION OF SYSTEM STATE DURING TESTING

BACKGROUND

The present disclosure relates generally to computing systems, and more particularly to the inspection of system state during testing.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computing systems, whether they are complex servers or simpler standalone computers, tablets, or mobile devices, often include a significant number of interacting processors, hardware devices, and software components. The processors may include single processors, multi-core processors, and/or multiple processors. The hardware devices may include memory, secondary storage devices like flash drives and disk drives, and interfacing devices such as network interface components, graphics cards, hardware accelerators, and data acquisition systems, just to name a few. The software components may include operating systems, drivers for the hardware devices, services, application programming interfaces (APIs), software libraries, user applications, and/or the like.

To help ensure proper operation of the computing system one or more tests are typically designed and run on the computing systems to verify and/or validate the proper operation of the computing systems and the interactions between the processors, hardware devices, and/or software components. Before testing begins, the computing system is typically configured and/or provisioned with a baseline set of software components in a default and/or preferred configuration. A test, typically in the form of a software component, is executed to test one or more of the features of the pre-configured software components and/or interactions between the software components and hardware devices. The test may exercise features of the pre-configured software components and/or hardware and/or alter the configurations of the pre-configured software components and/or hardware. In some instances, the test may alter the configurations of the software components and/or hardware to test atypical and/or rarely used operation modes. Rather than test the entire computing system with a single test, a series of separate tests are typically developed to focus on specific subsets of the processors, hardware devices, and/or software components. Each of the separate tests may be designed and/or architected without knowing what other tests might be in use and so an assumption is made that the test will be run in a system with the baseline set of software components with a default configuration. This leads to the possibility that the changes made to the configurations of the software components and/or hardware devices made by other tests may interfere with and/or cause unexpected failures in later tests. This makes it difficult to determine whether a test failed due to a defect in the software components and/or hardware devices or whether the failure was caused by side effects from a previously run test. This may be further complicated when a change made by one test may not cause a problem until many tests later. One solution is to reset and/or rebuild the baseline set of software components and default and/or preferred configuration between each test, but this is typically very time consuming and impractical.

Accordingly, it would be desirable to provide systems and methods to make it easier to determine whether and to what extent tests are making changes to a configuration for a computing system.

SUMMARY

According to one example, a method of testing a system includes determining one or more inspection modules for examining respective portions of a state of the system using a test inspector, initializing each of the inspection modules, saving the respective portions of the state of the system using the inspection modules, executing a test of the system, checking the respective portions of the state of the system using the inspection modules, and repeating the saving, executing, and checking for each additional test of the system. The test inspector is executed by one or more processors of the system.

According to another example, a system includes a memory storing a state repository and one or more processors executing a test inspector, one or more inspection modules, and a plurality of tests for the system. The test inspector initializes each of the inspection modules using a respective initializer sub-module of each of the inspection modules, saves respective portions of a state of the system in the state repository using a respective state save sub-module of each of the inspection modules, executes a first one of the tests, checks the respective portions of the state of the system using a respective state compare sub-module of each of the inspection modules, and repeats the saving, executing, and checking for each additional one of the tests.

According to yet another example, a non-transitory machine-readable medium comprising a plurality of machine-readable instructions which when executed by one or more processors associated with an application server are adapted to cause the one or more processors to perform a method. The method includes identifying one or more inspection modules for examining respective portions of a state of the computing system using a test inspector, identifying a plurality of tests for testing the computing system, and initializing each of the inspection modules. For each of the tests, the method further includes determining, by each one of the inspection modules, one or more first state variables and corresponding values associated with the respective portions of the state of the system; filtering, by each of the inspection modules, the one or more first state variables and corresponding first values based on one or more white lists of state variables, one or more black lists of state variables, or both to determine one or more second state variables and corresponding second values; saving, by each of the inspection modules, the one or more second state variables and corresponding second values in a state repository; executing one of the tests; determining, by each one of the inspection modules, one or more third state variables and corresponding third values associated with the respective portions of the state of the system; filtering, by each of the inspection modules, the one or more third state variables and corresponding third values based on the white lists, the black lists, or both to determine one or more fourth state variables and corresponding fourth values; comparing the fourth state variables and corresponding fourth values to the second state variables and corresponding fourth values; and reporting differences based on the comparing.

In the figures, elements having the same designations have the same or similar functions.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Figure 1:
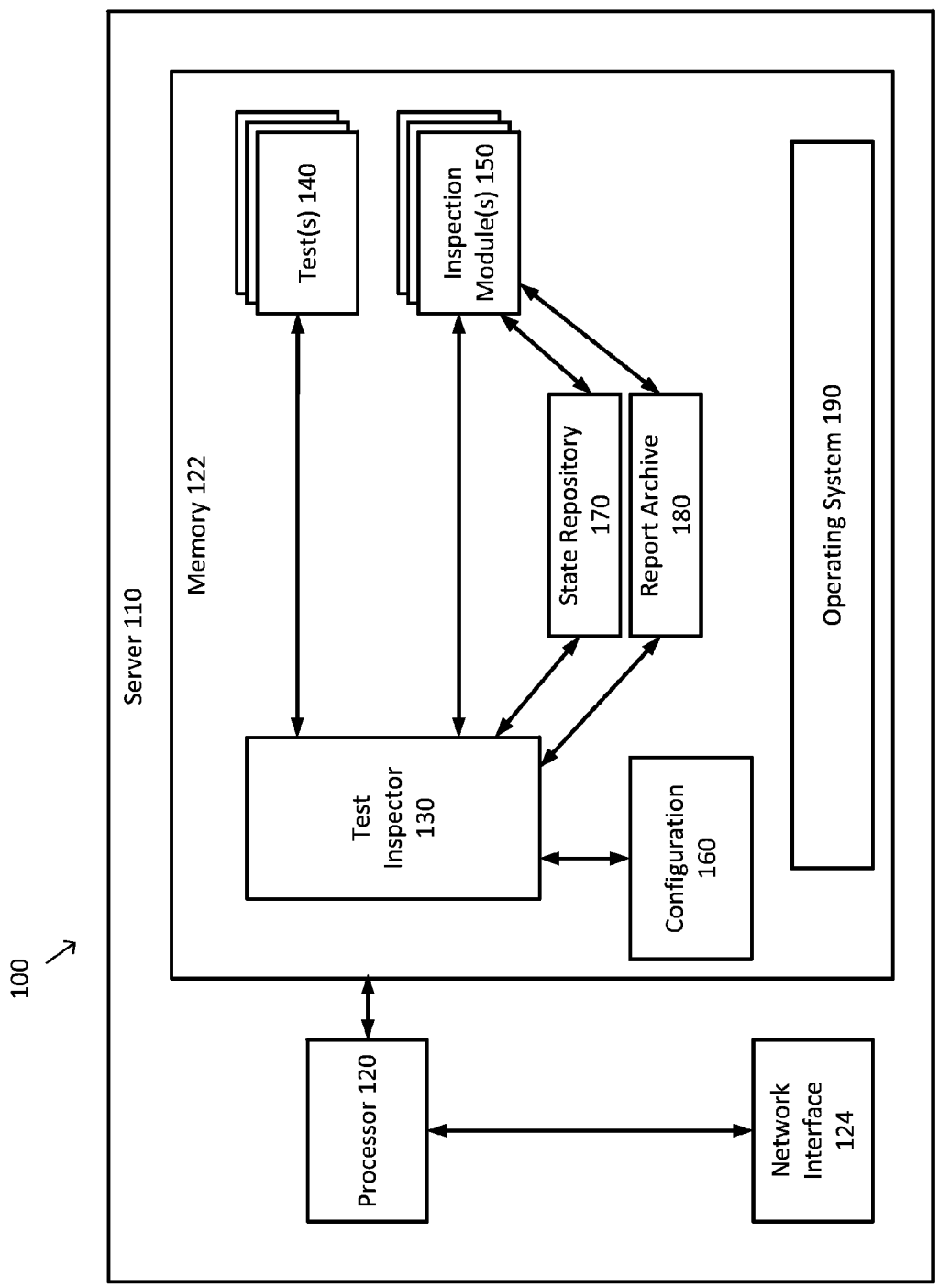
FIG. 1 is a simplified diagram of a computing system according to some examples.

FIG. 1 is a simplified diagram of a computing system 100 according to some examples. As shown in FIG. 1, computing system 100 includes a server or test bed 110. In some examples, server 110 may be a standalone workstation, a personal computer, a tablet, a mobile device, a cluster, a production server, within a virtual machine, and/or the like. Server 110 includes a processor 120 coupled to memory 122 and a network interface 124. In some examples, processor 120 may control operation and/or execution of hardware and/or software on server 110. Although only one processor 120 is shown, server 110 may include multiple processors, multi-core processors, field programmable gate arrays (FPGAs), application specific integrated circuits (ASICs), and/or the like. Memory 122 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 122 may be used to store various software components for both operating and/or testing the software components and/or the hardware of server 110. To support the testing of server 110, the software components include a test inspector 130. Test inspector 130 has the dual responsibility for coordinating the execution of one or more tests 140, but also for using one or more inspection modules 150 for evaluating the state of the server 110, the hardware of server 110, and/or the state and/or configuration of the hardware and/or software components of server 110. Test inspector 130 is designed to be both modular and extensible so that the number, types, execution order, and/or execution options of tests 140 and/or inspection modules 150 may be specified in a flexible fashion using a configuration 160. In some examples, each of the inspection modules 150 may be designed to inspect a specific subset of the testing and/or server state so that the test inspector 130 may be used to flexibly monitor and/or inspect the portions of the testing and/or server state that are relevant for the particular tests 140 being executed. In some examples, the inspection modules 150 may include inspection modules for files and file systems, services, kernel modules, environment variables and/or registry entries, networking state, security settings, system context, packages, mounted devices, and/or the like. In some examples, the networking state may include configuration for network interface 124, firewall settings, and/or the like.

Configuration 160 may include any combination of configuration files, command line and/or function call parameters, environment variables, registry entries, and/or the like. In some examples, configuration 160 may include a list of tests 140 to be run on server 110 to verify and/or validate one or more software components and/or hardware devices of server 110. In some examples, configuration 160 may include a list of inspection modules 150 to be used between the execution of each of the tests 140 to determine how and/or to what extent each of the tests 140 may be altering the configuration and/or environment of server 110. In some examples, the list of tests 140 and/or inspection modules 150 may include a white list of tests 140 and/or inspections modules 150 to run, a black list of tests 140 and/or inspection modules 150 on server 110 that are omitted, and/or a combination of a black list and a white list. In some examples, the black list and/or white list may be specified using one or more keywords, a delimiter (e.g., comma or space) separated list, and/or notation (e.g., "+", "−", "!", etc.) to include and/or exclude a test 140 and/or an inspection module 150. In some examples, the list of tests 140 and/or inspection modules 150 may support the organizing of tests 140 and/or inspection modules 150 into one or more groups to simplify the specification of testing and/or execution order options.

In some examples, configuration 160 may include parameters and/or entries to specify the execution order of the tests 140 and/or inspection modules 150. In some examples, the execution order may be in the order of inclusion in a list or white list and/or may include a sequencing mechanism, such as numbering. In some examples, configuration 160 may include execution options to additionally specify execution order of inspection modules 150. In some examples, the execution options may include serial execution, semi-parallel execution, parallel execution, reverse execution, and/or the like. Serial execution includes executing each inspection module 150 in the designated execution order. Semi-parallel execution includes executing each of the inspection modules 150 in a group in parallel while executing each group in serial order. Parallel execution includes executing each of the inspection modules 150 concurrently. Reverse execution includes executing the inspection modules in the reverse order to the designated execution order. In some examples, inspection modules 150 may be executed in parallel by spawning a process and/or thread for each inspection module 150.

In some examples, configuration 160 may include parameters and/or entries to specify execution options for the inspection modules 150. In some examples, the execution options may also specify whether the inspection modules 150 are to be run in a save and compare mode or a backup and restore mode. The save and compare mode includes having the inspection module 150 record portions of the testing and/or server state before a test 140 is executed (e.g., a pre-test state) and then compare the testing and/or server state after the test 140 is executed (e.g., a post-test state), with any differences in state being reported. The backup and restore mode includes having the inspection module 150 record a portion of the testing and/or server state before a test 140 is executed and then restore the testing and/or server state to the pre-test state after the test 140 is executed. In some examples, the portion of the testing and/or server state for backup and restore mode may include more, fewer, or the state variables than the portion of the testing and/or server state for save and compare mode. In some examples, the operations of scan and compare mode may be included as a subset of backup and restore mode. In some examples, when the backup and restore mode is not supported by an inspection module 150, the inspection module 150 may be run in the save and compare mode.

In some examples, configuration 160 may include additional parameters and/or entries to support test inspector 130 and/or the inspection modules 150. In some examples, the additional parameters and/or entries may include one or more file paths, one or more uniform resource locators (URLs), one or more environment and/or registry settings, and/or the like. In some examples, the file paths may include locations of directories where the tests 140 and/or the inspection modules 150 may be located, and/or the like.

Referring back to FIG. 1, memory 122 may be used to provide storage for a state repository 170 accessible by the test inspector 130 and/or the inspection modules 150. State repository 170 may be used by any of the inspection modules 150 to store the pre-test testing and/or server state while running in either save and compare mode and/or backup and restore mode. In some examples, state repository 170 may be used to store a post-test testing and/or server state. In some examples, each inspection module 150 may store its testing and/or server state separate from the other inspection modules 150. In some examples, each testing and/or server state may be indexed and/or tagged with a sequencing number and/or timestamp to support differentiation between different testing and/or server states taken before execution of each of the tests 140. In some examples, state repository 170 may include one or more files, one or more directories, and/or one or more databases.

Memory 122 may also be used to provide storage for a report archive 180 accessible by the test inspector 130 and/or the inspection modules 150. Report archive 180 may be used by any of the inspection modules 150 to provide an output report indicating the results of any of the store, compare, backup, and/or restore operations, including any differences detected between the pre-test and post-test testing and/or server states. In some examples, reports may be generated using different verbosity levels depending upon the amount of detail desired. In some examples, the verbosity level may control the number and/or type of information messages included in the report. In some examples, the verbosity level may control whether the passing conditions are reported or whether just failing (i.e., differences in state) are reported. In some examples, the verbosity level may control whether the report is in a specific reporting format, such as one or more beakerlib logging formats. In some examples, each of the reports may be generated for display to a user (e.g., in text, html, and/or the like) or for examination by a separate analyzer tool (e.g., in eXtensible Markup Language (XML), and/or the like). In some examples, report archive 180 may include individual reports for each inspection module 150, combined reports for each compare and/or restore after a test 140 is executed, and/or a monolithic report for an entire testing session. In some examples, the report may be marked and/or tagged with a sequence number and/or identifier, an inspection module identifier, and/or a timestamp to support differentiation between different reports generated at different times and/or by different inspection modules 150. In some examples, report archive 180 may include one or more files, one or more directories, and/or one or more databases.

Memory 122 may also store an operating system 190. Operating system 190 may include one or more commands, utilities, services, batch execution modules, shells, APIs, and/or the like that may be used by test inspector 130 and/or any of the tests 140 and/or inspection modules 150. In some examples, operating system 190 may provide mechanisms for examining the state of files, file systems, services, kernel modules, environment variables, registry entries, networking state, security settings, system context, packages, mounted devices, network interface 124, firewall settings, and/or the like Networking interface 124 may include one or more drivers and/or hardware modules for providing one or more ports that may be used to couple server 110 to one or more networks. Each of the one or more networks may be any kind of network including a universal serial bus (USB), a serial bus such as I2C, a local area network (LAN), an Ethernet, a wide area network (WAN), an intranet, an internet, and/or the like.

Figure 2:
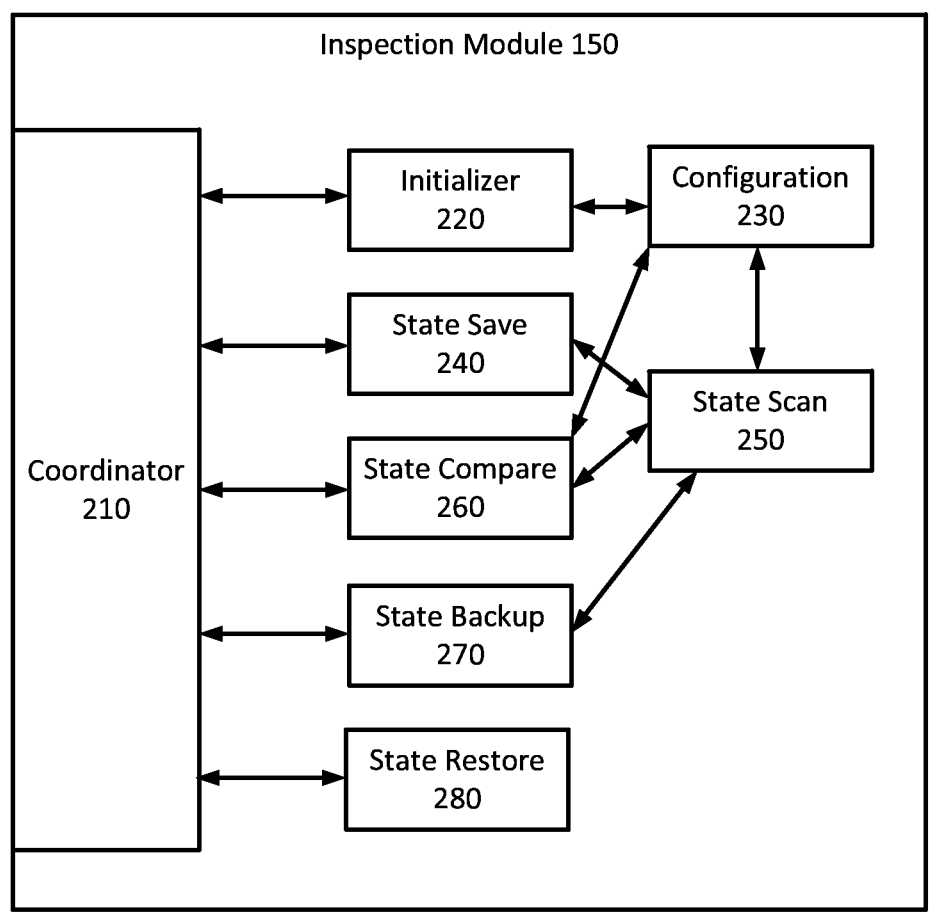
FIG. 2 is a simplified diagram of an architecture for an inspection module according to some examples.

FIG. 2 is a simplified diagram of an architecture for an inspection module 150 according to some examples. As shown in FIG. 2, inspection module 150 includes a coordinator sub-module 210. Coordinator sub-module 210 may be used by inspection module 150 to provide an interface by which other software modules, such as test inspector 130 may access and use the functionality of inspection module 150. In some examples, the interface may include one or more APIs to provide access to inspection module 150. In some examples, the APIs may include a single function call and/or command with one or more parameters and/or arguments to indicate which of the operations of inspection module 150 are desired. In some examples, the APIs may include separate function calls and/or commands, with or without parameters and/or arguments, for each of the operations supported by inspection module 150. In some examples, the interface for each inspection module 150 may be uniform so that test inspector 130 may execute each of the inspection modules 150 using a same calling signature to specify which operations of the inspection module 150 are desired. In some examples, the interface may provide additional parameters and/or arguments to indicate paths and/or locations for state repository 170 and/or report archive 180, reporting verbosity levels, and/or the like. Upon receiving a request to perform an operation, inspection module 150 directs the request to an appropriate sub-module of inspection module 150.

One of the sub-modules of inspection module 150 is an initializer sub-module 220 for performing one or more initialization operations before inspection module 150 is used to perform other operations. In some examples, initializer sub-module 220 may initialize one or more file paths, environment variables, registry settings, and/or the like. In some examples, initialization values may be provided by a configuration 230 and/or passed as a parameter to initializer sub-module 220 from coordinator sub-module 210. In some examples, configuration 230 may include default settings for the file paths, environment variables, registry settings, and/or the like, which may be overridden by one or more parameters provided by coordinator sub-module 210. As an example, configuration 230 may include a default verbosity setting for inspection module 150, which may be overridden by a parameter provided by test inspector 120 via coordinator sub-module 210.

In some examples, configuration 230 may further include one or more filtering and/or configurations settings that are specific to each inspection module 150. In some examples, the filtering and/or configuration settings may be used to provide one or more black lists and/or white lists indicating portions of the testing and/or server state that are inspected by inspection module 150. In some examples, the filtering and/or configuration settings may be used to ignore designated elements of the testing and/or server state and/or to omit the reporting of designed differences in the testing and/or server state when inspection module 150 is generating a report. In some examples, the black lists and/or white lists may be implemented using regular expressions, wild cards, and/or the like to specify a group of state variables of interest using a single entry. In some examples, when configure 230 is implemented using one or more files, the files may include blank lines, white space, and/or comments to support readability and maintenance. The filtering and/or configuration settings are described in more detail below with respect to individual examples of inspection module 150.

Inspection module 150 further includes sub-modules for saving, scanning, comparing, backing up, and restoring testing and/or server state in the form of a state save sub-module 240, a state scan sub-module 250, a state compare sub-module 260, an optional state backup sub-module 270, and an optional state restore sub-module 280.

State save sub-module 240 is responsible for saving a copy of a portion of the testing and/or server state that is relevant to inspection module 150. In some examples, state save sub-module 240 is used when inspection module 150 is used in scan and compare mode. In some examples, state save sub-module 240 may include one or more scripts, operating system calls, and/or utility calls for performing its functions. State save sub-module 240 uses state scan sub-module 250 to scan the testing and/or server 110 environment to identify one or more state variables that are being inspected by inspection module 150. In some examples, state scan sub-module 250 may include one or more scripts, operating system calls, and/or utility calls for performing its functions. In some examples, state scan sub-module 250 may determine the state variables of interest using one or more white lists of state values in configuration 230. In some examples, the collected state variables and their values may be filtered based on one or more white lists or black lists included in configuration 230. In some examples, state scan sub-module 250 may receiver one or more parameters to indicate whether the scan is performed using the filtering and/or configuration settings in configuration 230 and/or using scans with a more inclusive or less inclusive list of state variables. In some examples, state scan sub-module 250 may use a less inclusive, more inclusive, and/or a same scan while in save and compare mode. Once collected by state scan sub-module 250 and returned to state save sub-module 240, the state variables and their values are then converted to a suitable format and recorded in state repository 170. In some examples, the suitable format may include plain text, XML, key-value pairs, and/or the like. In some examples, the recorded state values may be marked and/or tagged using a sequencing number or identifier provided as a parameter to state save sub-module 240 and/or a timestamp. Under normal practice, state save sub-module 240 is run prior to executing any of the tests 140 to establish a pre-test testing and/or server state.

State compare sub-module 260 is responsible for comparing a portion of the testing and/or server state to a previously recorded portion of the testing and/or server state. In some examples, state compare sub-module 260 is used when inspection module 150 is used in scan and compare mode. In some examples, state compare sub-module 240 may include one or more scripts, operating system calls, and/or utility calls for performing its functions. Like state save sub-module 240, state compare sub-module 260 uses state scan sub-module 250 to scan and determine the values of state variables of interest. Once collected by state scan sub-module 250 and returned to state compare sub-module 260, the state variables and their values are then compared to previous state variables and their values recorded in state repository 170 by state save sub-module 240. In some examples, the state variables and their values may be compared individually based on a key and/or other identifier used to identify each of the state variables. In some examples, a difference tool, such as diff, may be used to compare the state variables and their values. In some examples, the differences may include the discovery of new state variables and/or removal of state variables from the testing and/or server state. Any differences between the recorded state variables and their values and the current state variables and their values is then added to a report, which is then stored in report archive 180. In some examples, the report may be marked and/or tagged with a sequence number and/or identifier, an inspection module identifier, and/or a timestamp to support differentiation between different reports generated at different times and/or by different inspection modules 150. In some examples, the previous state variables and their values to compare to may be indicated by a sequence number and/or identifier passed to state compare sub-module 260, a last used sequence number and/or identifier recorded by state save sub-module 240 (e.g., in an environment variable and/or registry entry), a most recent timestamp, and/or the like. In some examples, the previous state variables and their values may be the last recorded state values for inspection module 150 or state variables and their values recorded by other prior uses of state scan sub-module 240. Under normal practice, state compare sub-module 260 is run after executing any of the tests 140 to compare a post-test testing and/or server state to a pre-test testing and/or server state.

Optional state backup sub-module 270 is similar to state save sub-module 240, but is not generally applicable to each of the inspection modules 150. Depending upon the type and kind of state variables of interest to inspection module 150, it may not be practical and/or possible to create a backup of the state variables and their values that may be recovered. In some examples, this may occur because one or more of the state variables are effectively read only values, which cannot be set by inspection module 150. In some examples, state backup sub-module 270 may include one or more scripts, operating system calls, and/or utility calls for performing its functions. Like state scan sub-module 240, state backup sub-module 270 uses state scan sub-module 250 to scan for the values of state variables of interest. In some examples, the scan used for state backup sub-module 270 may be more inclusive, less inclusive, and/or the same as the scan used for state save sub-module 240. Once collected by state scan sub-module 250 and returned to state backup sub-module 270, the state variables and their values are then converted to a suitable format and recorded in state repository 170. In some examples, the suitable format may include plain text, XML, key-value pairs, and/or the like. In some examples, the recorded state variables and their values may be marked and/or tagged using a sequencing number or identifier provided as a parameter to state backup sub-module 270 and/or a timestamp. Under normal practice when inspection module 150 supports backup and restore mode and backup is desired, state backup sub-module 270 is run prior to executing any of the tests 140 to establish a pre-test testing and/or server state.

Optional state restore sub-module 280 is not generally applicable to each of the inspection modules 150. In some examples, state restore sub-module 270 may include one or more scripts, operating system calls, and/or utility calls for performing its functions. State restore sub-module 280 recovers values for state variables previously recorded in state repository 170 by state backup sub-module 270 and then restores the state variables in the testing and/or server state based on their recovered values. In some examples, the previous state variables and their values to recover to may be indicated by a sequence number and/or identifier passed to state restore sub-module 280, a last used sequence number and/or identifier recorded by state backup sub-module 270 (e.g., in an environment variable and/or registry entry), a most recent timestamp, and/or the like. In some examples, the previous state variables and their values may be the last recorded state variables and their values for inspection module 150 or state variables and their values recorded by other prior uses of state backup sub-module 270. Under normal practice when inspection module 150 supports backup and restore mode and backup is desired, state restore sub-module 280 is run after executing any of the tests 140 to restore the post-test testing and/or server state to a pre-test testing and/or server state.

Figure 3:
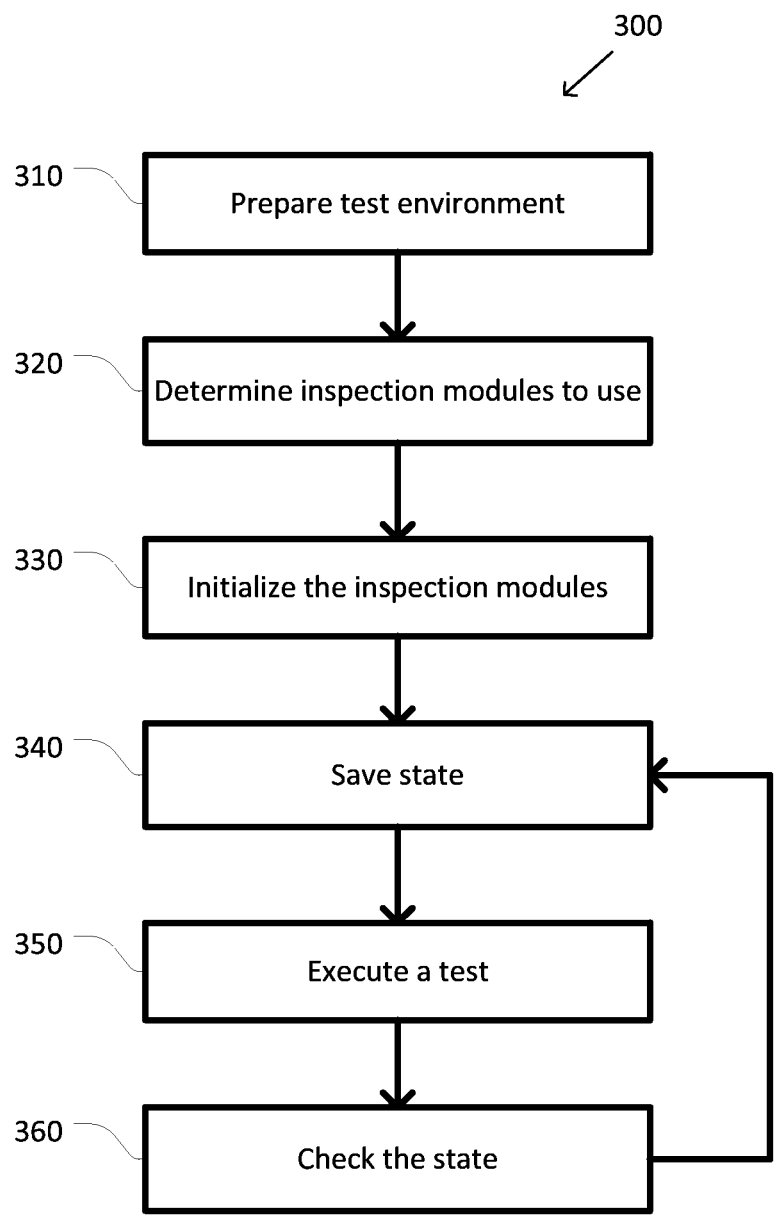
FIG. 3 is a simplified diagram of a method of testing a computing system according to some examples.

FIG. 3 is a simplified diagram of a method 300 of testing a computing system according to some examples. In some examples, one or more of the processes 310-360 of method 300 may be implemented, at least in part, in the form of executable code stored on non-transient, tangible, machine readable media that when run by one or more processors (e.g., the processor 120 of server 110) may cause the one or more processors to perform one or more of the processes 310-360. In some examples, method 300 may be used by test inspector 130 to perform testing of server 110. In some examples, one or more of the processes 310-360 may generate one or more reports and/or one or more logs recording the progress of processes 310-360. In some examples, the amount of information included in the reports and/or logs may depend on one or more verbosity settings.

At a process 310, the test environment is prepared. Before the testing environment on a server, such as server 110, may be tested, the testing environment is placed in a state that is to be tested. In some examples, this may include installing and/or configuring one or more operating system components, files, file systems, services, kernel modules, environment variables, registry entries, networking state, security settings, system context, packages, firewall settings, and/or the like. In some examples, one or more hardware devices may also be installed and/or configured along with drivers for the hardware devices.

At a process 320, one or more inspection modules to use during the testing is determined. In some examples, a testing script and/or application, such as test inspector 130, determines the inspection modules, such as inspection modules 150, which are to be used to during the testing. In some examples, configuration information, such as the configuration information in configuration 160 may be examined to determine the inspection modules to use. In some examples, the configuration information may include a parameter list and/or one or more configuration files that may include one or more white lists and/or one or more black lists of inspection modules to use. In some examples, determining the inspection modules to use may include determining groupings of the inspection modules, execution orders for the inspection modules, and/or execution options. In some examples, the execution order may include indicating that the inspection modules are to be executed in serial order, in semi-parallel, in parallel, in reverse order, and/or in the like. In some examples, the execution options may include operating the testing system in save and compare mode and/or backup and restore mode. In some examples, additional parameters and/or configuration information to support testing may also be determined. In some examples, the additional configuration may include one or more file paths, URLs, environment and/or registry settings, and/or the like.

At a process 330, the inspection modules are initialized. Each of the inspection modules identified during process 320 is initialized. In some examples, an initializer sub-module, such as initializer sub-module 220, of each inspection module is activated by invoking one or more commands and/or API calls that cause the respective inspection module to run its initializer sub-module. In some examples, the initializer sub-modules may be invoked by accessing the interface for the inspection module through a corresponding coordinator sub-module, such as coordinator sub-module 210. In some examples, each initializer sub-module may initialize one or more file paths, environment variables, registry settings, and/or the like. In some examples, initialization information may be provided by a configuration, such as configuration 230 and/or passed as one or more parameters to the initializer sub-module.

Figure 4:
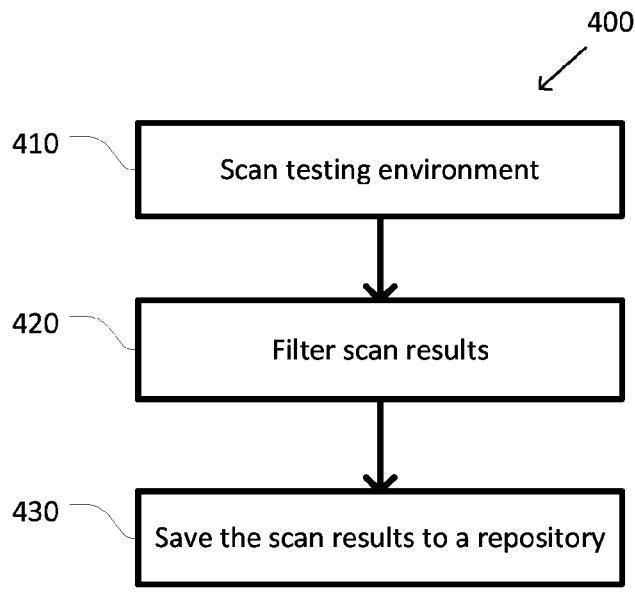
FIG. 4 is a simplified diagram of a process of state saving according to some examples.

At a process 340, the state is saved. Each of the inspection modules identified during process 320 is used to save a respective portion of the testing and/or server state that is relevant to the respective inspection module. In some examples, each of the inspection modules is executed based on the execution order and execution options identified during process 320. FIG. 4 is a simplified diagram of a process of state saving 400 according to some examples. In some examples, one or more of the processes 410-430 of process 400 may be implemented, at least in part, in the form of executable code stored on non-transient, tangible, machine readable media that when run by one or more processors (e.g., the processor 120 of server 110) may cause the one or more processors to perform one or more of the processes 410-430. In some examples, process 400 may be performed using a combination of state save sub-module 240 and/or state scan sub-module 250. In some examples, process 400 may be executed for each of the inspection modules identified during process 320.

At a process 410, a testing environment is scanned. In some examples, a portion of the testing environment of interest to the inspection module is scanned. In some examples, one or more scripts, operating system calls, and/or utility calls, and/or the like are used to scan for the existence of values of one or more state variables of interest to the inspection module. In some examples, the state variables of interest may be identified using one or more white lists and/or one or more black lists. In some examples, the one or more white lists and/or black lists may be included in the configuration for the inspection module. In some examples, process 410 may be performed by state scan sub-module 250.

At a process 420, the scan results are filtered. Using one or more black lists and/or other mechanisms, the state values collected during the scan of process 410 are filtered to remove any state variables and their values that are not of interest to the inspection modules. In some examples, state variables and their values may be omitted because those state variables are not associated with changes in testing environment state that are likely to affect a test. In some examples, the blacklists may be included in the configuration for the inspection module. In some examples, the filtering of process 420 is optional and may be omitted when the white lists and/or black lists of process 410 are sufficient to prevent collection of state variables and their values that are not of interest. In some examples, process 420 may be performed by state scan sub-module 250.

At a process 430, the scan results are saved to a repository. The state variables and their values collected during process 410 and optionally filtered during process 420 are then converted to a suitable format and recorded in a state repository, such as state repository 170. In some examples, the suitable format may include plain text, XML, key-value pairs, and/or the like. In some examples, the recorded state variables and their values may be marked and/or tagged using a sequencing number or identifier and/or a timestamp so that these versions of the state values may be later segregated from versions of the state variables and their values taken during a prior and/or subsequent use of process 400.

Referring back to FIG. 3 and process 340, once process 400 is performed by each of the inspection modules identified during process 320, a test may be executed using a process 350. In some examples, the test may be executed by invoking one or more commands, executing one or more programs and/or scripts, and/or making one or more API calls.

Figure 5:
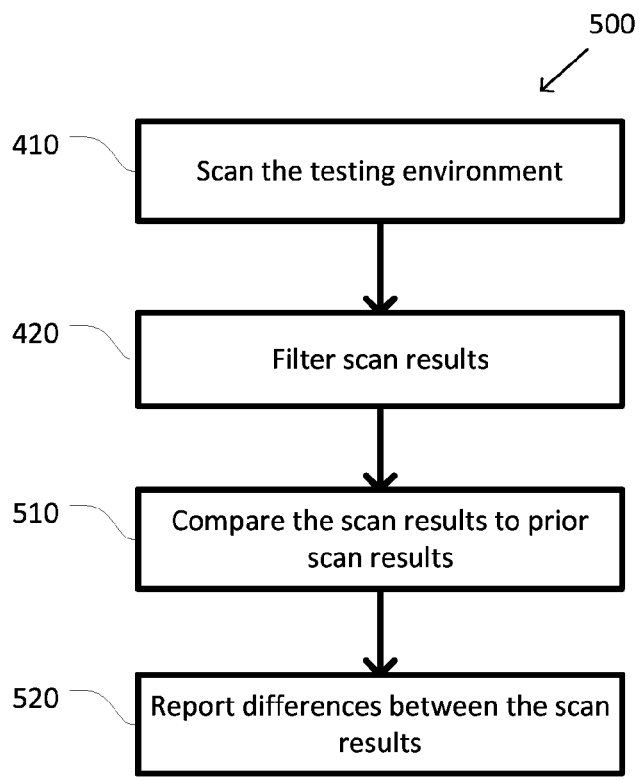
FIG. 5 is a simplified diagram of a process of state comparison according to some examples.

At a process 360, the state is checked. Each of the inspection modules identified during process 320 is used to compare a respective portion of the testing and/or server state that is relevant to the respective inspection module. In some examples, each of the inspection modules is executed based on the execution order and execution options identified during process 320. FIG. 5 is a simplified diagram of a process of test state comparison 500 according to some examples. In some examples, one or more of the processes 410, 420, 510, and/or 520 of process 500 may be implemented, at least in part, in the form of executable code stored on non-transient, tangible, machine readable media that when run by one or more processors (e.g., the processor 120 of server 110) may cause the one or more processors to perform one or more of the processes 410, 420, 510, and/or 520. In some examples, process 500 may be performed using a combination of state compare sub-module 260 and/or state scan sub-module 250. In some examples, process 500 may be executed for each of the inspection modules identified during process 320.

Process 500 begins by substantially repeating processes 410 and 420 of process 400 in order to determine a post-test testing and/or server state. In some examples, the same state variables scanned, filtered, and saved during the state save of process 400 are determined by reapplication of processes 410 and/or 420. In some examples, a different collection of state variables and their values may be determined when one or more state variables are added and/or removed by the test of process 350 from the testing and/or server state.

At a process 510, the scan results are compared to prior scan results. In some examples, the state variables and their values from processes 410 and/or 420 are compared to previous state variables and their values recorded in a state repository, such as state repository 170, by process 400. In some examples, the state variables and their values may be compared individually based on a key and/or other identifier used to identify each of the state variables. In some examples, a difference tool, such as diff, may be used to compare the state variables and their values. In some examples, the differences may include the discovery of new state variables and/or removal of state variables from the testing and/or server state. In some examples, the previous state variables and their values to compare to may be indicated by a sequence number and/or identifier passed to process 500, a last used sequence number and/or identifier recorded by process 400 (e.g., in an environment variable and/or registry entry), a most recent timestamp, and/or the like. In some examples, the previous state variables and their values may be the last state variables and their values recorded for the inspection module by process 400 or state variables and their values recorded by other prior uses of process 400.

At a process 520, differences between the scan results are reported. In some examples, the differences determined during process 510 may be added to a report, which is then stored in a report archive, such as report archive 180. In some examples, the report may be marked and/or tagged with a sequence number and/or identifier, an inspection module identifier, and/or a timestamp to support differentiation between different reports generated at different times and/or by different inspection modules. In some examples, the amount of detail to include in the report may be based on a verbosity setting for the inspection module.

Referring back to FIG. 3 and process 360, once process 500 is performed by each of the inspection modules identified during process 320, additional save-test-compare cycles involving processes 340-360 may be repeated until each of the tests for the testing environment are performed.

As discussed above and further emphasized here, FIGS. 3-5 are merely an example which should not unduly limit the scope of the claims. One of ordinary skill in the art would recognize many variations, alternatives, and modifications. Method 300 of FIGS. 3-5 is consistent with the use of a test inspector, such as test inspector 230, being operated in a save and compare mode of operation. In some examples, method 300 may be modified to support a backup and restore mode of operation. In some examples, process 400 may be modified to use the scanning, filtering, and saving provided by a state backup sub-module, such as state backup sub-module 260, rather than a state save sub-module. In some examples, process 500 may be replaced by the use of a state restore sub-module, such as state restore sub-module. 280. In some examples, the state restore sub-module may perform a two part process where a prior saved set of state values are recovered from the state repository and then used to restore the state of the testing environment to its pre-test test for the recovered state variables. In some examples, inspection modules that do not support backup and restore mode may be operated in scan and compare mode. In some examples, both the save and compare mode and the backup and restore mode may be used during method 300.

To help illustrate the types of testing and/or server state that may be inspected using test inspector 130 and method 300, several examples of inspection modules 150 are discussed below.

In some examples, a file inspection module 150 may be used for examining the state of files and file systems. In some examples, an existing file scanning tool, such as Advanced Intrusion Detection Environment (AIDE) may be modified and/or configured to support file inspection module 150. In some examples, the file scanning tool may implement much of the functionality of state scan sub-module 250. In some examples, the file scanning tool may be configured to examine one or more directories, such as operating system directories, of interest using a combined black list and white list. In some examples, the combined black list and white list may be part of configuration 230. In some examples, the combined black list and white list may provide the filtering of process 420. In some examples, the combined black list and white list may specify base directories to scan and then exclude one or more subdirectories within the base directories. In some examples, when the operating system is Linux, the base directories may include /root, /home, and /var and the excluded subdirectories may include directories with cached (e.g. .cache, .ssh/known_hosts, .tmp), random (.rnd), and/or other information that routinely changes during operating system use. In some examples, the combined black list and white list may include specific types of files to ignore, such as log files. In some examples, because it is not practical to restore the state of files in most file systems, file inspection module 150 may be limited to scan and compare mode.

In some examples, a kernel modules inspection module 150 may be used for examining the state of kernel modules loaded into the operating system. In some examples, the kernel modules inspection module 150 may use its state scan sub-module 250 to determine a list of loaded kernel modules during process 410 that are compared during process 510 to determine whether any changes in kernel modules are made by a test. In some examples, the state scan sub-module 250 may use operating system tools, such as lsmod, to scan for the loaded kernel modules. In some examples, the kernel modules inspection module 150 may omit the filtering of process 420. In some examples, the kernel modules inspection module 150 may also monitor one or more operating system directories and/or files for tracking the status of kernel modules, such as /proc/sys/kernel/tainted. In some examples, because kernel modules may not be unloaded once loaded into the operating system, the kernel modules inspection tool 150 may be limited to scan and compare mode.

In some examples, a mounted devices inspection module 150 may be used for examining the state of mounted devices. In some examples, the mounted devices inspection module 150 may track the one or more disk drives, partitions, and/or the like mounted as file systems by the operating system and report any changes made by a test. In some examples, the mounted devices inspection module 150 may omit the filtering of process 420. In some examples, the mounted devices inspection module 150 may be limited to scan and compare mode.

In some examples, a security contexts inspection module 150 may be used for examining the state of access control lists and/or the like maintained by security enhancements, such as SELinux included in an operating system. In some examples, the access control list contexts (e.g., user, role, domain) may be examined to determine any changes made by a test and report the differences. In some examples, the security contexts inspection module 150 may omit the filtering of process 420. In some examples, the security contexts inspection module 150 may be limited to scan and compare mode.

In some examples, a security inspection module 150 may be used for examining the current state of one or more security Boolean variables. In some examples, a security enhancement, such as SELinux, may use on one or more Boolean variables to determine which security features are enabled and which are disabled. In some examples, the state scan sub-module 250 of the packages inspection module 150 may determine the security Boolean variables using one or more operating system commands, such as getsebool and/or the like. In some examples, the state restore sub-module 280 may use one or more operating system commands, such as setsebool, and/or the like to restore one or more security Boolean variables to a pre-test values. In some examples, the security inspection module 150 may omit the filtering of process 420. In some examples, the security inspection module 150 may support both scan and compare mode and backup and restore mode.

In some examples, a security policy inspection module 150 may be used for examining the current state of one or more security policies. In some examples, a security enhancement, such as SELinux, may use on one or more policies to determine how security features are applied. In some examples, the state scan sub-module 250 and/or the state restore sub-module 280 of the security policy inspection module 150 may determine and/or restore the security policies using one or more operating system commands, such as semanage and/or the like. In some examples, the security policy inspection module 150 may omit the filtering of process 420. In some examples, the security policy inspection module 150 may support both scan and compare mode and backup and restore mode.

In some examples, a services inspection module 150 may be used for examining the state of system services. In some examples, the services loaded into the operating system and/or current running state (running or stopped) of the services may be examined to determine any changes made by a test and report the differences. In some examples, the state scan sub-module 250 of the services inspection module 150 may determine the services and their state using one or more operating system commands, such as systemctl, chkconfig, and/or the like. In some examples, the services inspection module 150 may omit the filtering of process 420. In some examples, the services inspection module 150 may be limited to scan and compare mode.

In some examples, a firewall inspection module 150 may be used for examining the state of one or more ports in a firewall. In some examples, the various permission states of the one or more transport control protocol (TCP) and/or user datagram protocol (UDP) ports maintained by the firewall may be examined to determine whether the ports are configured for input, output, and/or forwarded network traffic. In some examples, the various permission states may be examined to determine any changes made by a test and report the differences. In some examples, the firewall inspection module 150 may omit the filtering of process 420. In some examples, the firewall inspection module 150 may support both scan and compare and backup and restore modes because it is possible to restore the various permission states to a pre-test state.

In some examples, a network inspection module 150 may be used for examining the state of the network configuration. In some examples, the state of one or more network interfaces, assigned Internet protocol (IP) addresses, networking modules, and/or the like may be examined to determine any changes made by a test and report the differences. In some examples, the networking modules may include name resolving modules, management modules, and/or the like. In some examples, the network inspection module 150 may omit the filtering of process 420. In some examples, the network inspection module 150 may support both scan and compare and backup and restore modes because it is possible to easily restore the network interfaces, IP addresses, networking modules, etc. to a pre-test state.

In some examples, a distributed file systems inspection module 150 may be used for examining the state of mounted network drives and file systems. In some examples, the mounted network drives and/or file systems used to access storage devices in a distributed storage system may be examined to determine any changes made by a test and report the differences. In some examples, the state scan sub-module 250 of the services inspection module 150 may be limited to certain types of file systems, such as the network file system (NFS). In some examples, the distributed file systems inspection module 150 may omit the filtering of process 420. In some examples, the distributed file systems inspection module 150 may be limited to scan and compare mode.

In some examples, a packages inspection module 150 may be used for examining the current versions of one or more installed packages. In some examples, the release version of each installed software package may be examined to determine any changes made by a test and report the differences. In some examples, the state scan sub-module 250 of the packages inspection module 150 may determine the packages and their version using one or more operating system commands, such as rpm, dpkg, HomeBrew, Microsoft Installer (MSI), and/or the like. In some examples, the packages inspection module 150 may include a black list of packages to be ignored during the filtering of process 420. In some examples, the packages inspection module 150 may be limited to scan and compare mode.

In some examples, an environment variable inspection module 150 may be used for examining the current values of one or more environment variables, registry entries, and/or the like. In some examples, the values assigned to and/or existence of one or more environment variables, registry entries, and/or the like may be examined to determine any changes made by a test and report the differences. In some examples, the state scan sub-module 250 and/or the state restore sub-module 280 of the environment variables inspection module 150 may determine and/or restore the environment variables, registry entries, and/or the like using one or more operating system commands, such as env and/or the like. In some examples, the environment variable inspection module 150 may implement the filtering of process 420 using one or more black lists and/or white lists to indicate the environment variables, registry entries, and/or the like that are of interest. In some examples, the black lists and/or the white lists may include entries with one or more wildcards. In some examples, the black lists may filter out environment variables, registry entries, and/or the like associated with the testing inspection system, command history, and/or the like. In some examples, the environment variable inspection module 150 may support both scan and compare mode and backup and restore mode.

Use of the testing systems and methods of FIGS. 1-5 provides many advantages over other testing approaches. In some examples, use of modular inspection modules in an extensible framework may make it easier to add or remove inspection modules to a testing environment so that those portions of the testing and/or server state that may affect one or more of the tests is scanned and monitored. In some examples, support for the save and compare mode may provide for a more efficient and less time consuming test as the testing environment does not have to be rebuilt and/or reinitialized after each test. In some examples, the scan-test-compare cycle may provide a framework for evaluating whether and/or to what extent each of the tests may affect the testing and/or server state. In some examples, this evaluation may help determine whether one or more of the tests is unintentionally and/or inappropriately affecting the testing and/or server state. In some examples, the evaluation may provide an indicator of the maturity of one or more of the tests. In some examples, the scan-test-compare cycle may also make it easier to track which tests have made changes to the testing and/or server state that may cause subsequent tests to fail. In some examples, the tracking may simplify debugging of tests and/or the systems being tested.

Some examples of server 110 may include non-transient, tangible, machine readable media that include executable code that when run by one or more processors (e.g., processor 120) may cause the one or more processors to perform the processes of method 300 and/or processes 400 and/or 500 as described above. Some common forms of machine readable media that may include the processes of method 300 and/or processes 400 and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative examples have been shown and described, a wide range of modification, change and substitution is contemplated in the foregoing disclosure and in some instances, some features of the examples may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method of testing a system, the method comprising:
    determining one or more inspection modules for examining respective portions of a state of the system using a test inspector, the test inspector being executed by one or more processors of the system;
    initializing each of the inspection modules;
    saving the respective portions of the state of the system using the inspection modules;

executing a test of the system;
checking the respective portions of the state of the system using the inspection modules; and
repeating the saving, executing, and checking for each additional test of the system;
wherein saving the respective portions of the state of the system comprises:
  determining one or more state variables associated with a first respective portion of the state of the system by consulting one or more white lists of state variables, one or more black lists of state variables, or both, the one or more white lists of state variables and the one or more black lists of state variables being different for different types of inspection modules;
  determining corresponding values for the one or more state variables; and
  saving the one or more state variables and corresponding values in a state repository.

2. The method of claim 1, wherein determining the one or more inspection modules comprises examining one or more white lists of inspection modules.

3. The method of claim 1, wherein the white lists of state variables or black lists of state variables include state variables specified using wildcards.

4. The method of claim 1, wherein consulting the one or more white lists of state variables, the one or more black lists of state variables, or both comprises filtering the one or more state variables based on the one or more white lists of state variables, the one or more black lists of state variables, or both.

5. The method of claim 1, further comprising reporting one or more differences between a pre-test and a post-test version of the state of the system based on the checking.

6. The method of claim 1, wherein checking a first one of the respective portions of the state of the system comprises:
  determining one or more current state variables and corresponding current values associated with the first respective portion of the state of the system; and
  comparing the one or more current state variables and corresponding current values to previously stored state variables and corresponding previously stored values stored in the state repository.

7. The method of claim 6, wherein comparing the one or more current state variables and corresponding current values to the previously stored state variables and corresponding previously stored values comprises determining whether the current state variables include same state variables as the previously stored state variables.

8. The method of claim 1, further comprising restoring a first one of the respective portions of the state of the system by setting the one or more state variables to the corresponding values stored in the state repository.

9. The method of claim 1, wherein the one or more inspection modules are each selected from a group consisting of a file inspection module, a kernel modules inspection module, a mounted devices inspection module, a security contexts inspection module, a security inspection module, a security policy inspection module, a services inspection module, a firewall inspection module, a network inspection module, a distributed systems inspection module, a packages inspection module, and an environment variable inspection module.

10. The method of claim 1, wherein saving the respective portions of the state of the system using the inspection modules comprises executing respective state save sub-modules of the inspection modules in serial order, in parallel, or in reverse order.

11. The method of claim 1, wherein:
the inspection modules are organized in groups; and
saving the respective portions of the state of the system using the inspection modules comprises executing respective state save sub-modules of the inspection modules in semi-parallel based on the groups.

12. A system comprising:
a memory storing a state repository; and
one or more processors executing a test inspector, one or more inspection modules, and a plurality of tests for the system;
wherein the test inspector:
  initializes each of the inspection modules using a respective initializer sub-module of each of the inspection modules;
  saves respective portions of a state of the system in the state repository using a respective state save sub-module of each of the inspection modules;
  executes a first one of the tests;
  checks the respective portions of the state of the system using a respective state compare sub-module of each of the inspection modules; and
  repeats the saving, executing, and checking for each additional one of the tests;
wherein a first one of the respective state save sub-modules:
  determines one or more state variables associated with a first respective portion of the state of the system by consulting one or more white lists of state variables, one or more black lists of state variables, or both, the one or more white lists of state variables and the one or more black lists of state variables being different for different types of inspection modules;
  determines corresponding values for the one or more state variables; and
  saves the one or more state variables and corresponding values in the state repository.

13. The system of claim 12, wherein:
the white lists of state variables or the black lists of state variables include state variables specified using wildcards.

14. The system of claim 12, wherein a first respective state compare sub-module:
  determines one or more current state variables and corresponding current values associated with a first respective portion of the state of the system; and
  compares the one or more current state variables and corresponding current values to previously stored state variables and corresponding previously stored values stored in the state repository.

15. The system of claim 12, wherein the test inspector further:
  creates a backup of a first respective portion of the state of the system using a state backup sub-module of a corresponding one of the inspection modules; and
  restores the first respective portion of the state of the system using a state restore sub-module of the corresponding one of the inspection modules.

16. The system of claim 12, wherein to consult the one or more white lists of state variables, the one or more black lists of state variables, or both, the test inspector filters the one or more state variables based on the one or more white lists of state variables, the one or more black lists of state variables, or both.

17. The system of claim 12, wherein:
the inspection modules are organized in groups; and
to save the respective portions of the state of the system using the respective state save sub-modules comprises executing the respective state save sub-modules in semi-parallel based on the groups.

18. A non-transitory machine-readable medium comprising a plurality of machine-readable instructions which when executed by one or more processors associated with a computing system are adapted to cause the one or more processors to perform a method comprising:
identifying one or more inspection modules for examining respective portions of a state of the computing system using a test inspector;
identifying a plurality of tests for testing the computing system;
initializing each of the inspection modules; and
for each of the tests:
determining, by each one of the inspection modules, one or more first state variables and corresponding values associated with the respective portions of the state of the computing system;
filtering, by each of the inspection modules, the one or more first state variables and corresponding first values based on one or more white lists of state variables, one or more black lists of state variables, or both to determine one or more second state variables and corresponding second values;
saving, by each of the inspection modules, the one or more second state variables and corresponding second values in a state repository;
executing one of the tests;
determining, by each one of the inspection modules, one or more third state variables and corresponding third values associated with the respective portions of the state of the computing system;
filtering, by each of the inspection modules, the one or more third state variables and corresponding third values based on the white lists, the black lists, or both to determine one or more fourth state variables and corresponding fourth values, the one or more white lists of state variables and the one or more black lists of state variables being different for different types of inspection modules;
comparing the fourth state variables and corresponding fourth values to the second state variables and corresponding fourth values; and
reporting differences based on the comparing.

19. The non-transitory machine-readable medium of claim 18, wherein the method further comprises restoring the fourth state variables associated with a first one of the inspection modules to the corresponding second values.

20. The non-transitory machine-readable medium of claim 18, wherein:
the inspection modules are organized in groups; and
saving, by each of the inspection modules, the one or more second state variables and corresponding second values in the state repository comprises executing respective state save sub-modules of the inspection modules in semi-parallel based on the groups.

* * * * *